United States Patent
Kim et al.

(10) Patent No.: US 6,883,306 B2
(45) Date of Patent: Apr. 26, 2005

(54) EMISSION TREATMENT SYSTEM AND CONTROL METHOD

(75) Inventors: Yone-Seung Kim, Suwon (KR); Hyung-Jei Cho, Yongin (KR); Chi-Young Jeong, Seoul (KR); Eun-Ki Hong, Gunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/331,247

(22) Filed: Dec. 30, 2002

(65) Prior Publication Data

US 2003/0221414 A1 Dec. 4, 2003

(30) Foreign Application Priority Data

May 29, 2002 (KR) ................................ 10-2002-0030029

(51) Int. Cl.⁷ .................................................. F01N 3/00
(52) U.S. Cl. .............................. 60/275; 60/274; 60/288
(58) Field of Search .......................... 60/274, 275, 287; 204/164, 177; 422/186.03, 186.04

(56) References Cited

U.S. PATENT DOCUMENTS

| | | | |
|---|---|---|---|
| 4,945,721 A | * | 8/1990 | Cornwell et al. ............. 60/274 |
| 5,715,677 A | * | 2/1998 | Wallman et al. ............... 60/274 |
| 6,269,631 B1 | * | 8/2001 | Neff et al. ..................... 60/274 |
| 6,475,350 B1 | * | 11/2002 | Palekar et al. ............... 204/164 |
| 2002/0034590 A1 | * | 3/2002 | Dosaka et al. ............... 427/446 |

FOREIGN PATENT DOCUMENTS

| | | |
|---|---|---|
| DE | 196 26 381 A1 | 7/1996 |
| GB | 2 366 747 A | 3/2002 |

* cited by examiner

*Primary Examiner*—Thomas Denion
*Assistant Examiner*—Diem Tran
(74) *Attorney, Agent, or Firm*—Morgan Lewis & Bockius LLP

(57) ABSTRACT

An emission treatment system for a vehicle is provided that includes a plasma reactor is disposed in a main exhaust pipe and configured to reduce noxious emissions of an engine. A bypass pipe is connected to the main exhaust pipe both before and after the plasma reactor such that exhaust emissions can be caused to bypass the plasma reactor. A control valve is disposed at a position where the main exhaust pipe and the bypass pipe intersect, and is configured to selectively open and close the main exhaust pipe and the bypass pipe. A power supply unit supplies power to the plasma reactor and the control unit is coupled to the power supply unit and the control valve controlling a voltage of power supplied to the plasma reactor and an operation of the control valve.

12 Claims, 2 Drawing Sheets

EMISSION TREATMENT SYSTEM AND CONTROL METHOD

FIELD OF THE INVENTION

Generally, the present invention relates to a vehicle emission treatment system. More particularly, the present invention relates to a system and control method for vehicle emission treatment that includes a plasma reactor.

BACKGROUND OF THE INVENTION

Conventionally, some vehicles include a plasma reactor incorporated into the exhaust pipe to treat emissions. Generally, the plasma reactor efficiently reduces noxious gaseous materials and noxious particles that are exhausted from an engine. The plasma reactor requires high-voltage electric power to reduce these emissions. However, the high-voltage systems often suffer from short circuits and open circuit failures.

Often the plasma reactor short circuits when excessive particles accumulate on a surface of the plasma reactor. The open circuit failure occurs by a malfunction of a power supply system caused by vibrations from the vehicle or other mechanical failures to the system.

Associated with plasma reactors generally is a system that uses an optimal power map to adjust the functioning of the plasma reactor to the operating conditions of the engine. However, a drawback of such systems is that they do not focus on stabilizing the plasma reactor system.

SUMMARY OF THE INVENTION

In a preferred embodiment of the present invention, an emission treatment system for a vehicle comprises a plasma reactor, a power supply unit, a direct-connecting pipe, a bypass pipe, a control valve, and a control unit. The plasma reactor is configured to reduce noxious emissions of an engine, and is positioned at one end of an exhaust pipe. The power supply unit supplies power to the plasma reactor. The direct-connecting pipe is configured to connect the plasma reactor to the exhaust pipe such that exhaust emissions can pass through the plasma reactor. The bypass pipe is connected to the direct-connecting pipe both before and after the plasma reactor such that the exhaust emissions can bypass the plasma reactor. The control valve is disposed at a position where the direct-connecting pipe and the bypass pipe intersect, and is configured to selectively open and/or close the direct-connecting pipe and/or the bypass pipe. The control unit is coupled to the power supply unit and the control valve and controls the voltage of power supplied to the plasma reactor and an operation of the control valve.

It is preferable that the power supply unit comprises a power source unit, a transformer, a high-voltage plug, and a high-tension cord. The power source unit provides power to the plasma reactor. The transformer is configured to boost a voltage of power supplied from the power source unit to the plasma reactor. The high-voltage plug is disposed beside the plasma reactor and configured to stably supply the boosted power to the plasma reactor. A high-tension cord connects the power source unit to the transformer and the transformer to the high-voltage plug.

Preferably, the power source unit comprises a battery of the vehicle. It is also preferable that the power source unit comprises a first alternator of the vehicle. It is also preferable that the power source unit comprises a second alternator of the vehicle.

In a preferred embodiment that the emission treatment system further comprises a warning lamp illuminated by a control signal from control unit in order to warn of a malfunction of the plasma reactor.

In another preferred embodiment the method for controlling an emission treatment system including a plasma reactor comprising applying power to the plasma reactor configured to reduce noxious emissions of an engine. Detecting a primary voltage and a primary current of a transformer to boost the voltage of power supplied to the plasma reactor. Determining whether the primary voltage of the transformer is less than a predetermined voltage. Determining whether the primary current of the transformer is less than a predetermined voltage if it is determined that the primary voltage is less than the predetermined voltage. Closing a bypass pipe such that exhaust emissions do not bypass the plasma reactor, and opening a direct-connecting pipe configured such that exhaust emissions pass through the plasma reactor, if it is determined that the primary current is less than a predetermined current.

It is also preferable that the method further comprises stopping power supplied to the plasma reactor if it is determined that the primary voltage of the transformer is not less than the predetermined voltage. It is further preferable that the method further comprises opening the bypass pipe and closing the direct-connecting pipe if it is determined that the primary current is not less than the predetermined current.

In a further preferred embodiment of the present invention, the emission treatment system comprises a plasma reactor, a bypass pipe, a control valve, a power supply unit, and a control unit. The plasma reactor is disposed in a main exhaust pipe, and is configured to reduce noxious emissions of an engine. The bypass pipe is connected to the main exhaust pipe both before and after the plasma reactor such that exhaust emissions can bypass the plasma reactor. The control valve is disposed at a position where the main exhaust pipe and the bypass pipe intersect, and is configured to selectively open and/or close the main exhaust pipe and/or the bypass pipe. The power supply unit supplies power to the plasma reactor. The control unit is coupled to the power supply unit and the control valve and controls a voltage of power supplied to the plasma reactor and operations of the control valve.

BRIEF DESCRIPTION OF THE DRAWINGS

The accompanying drawings, which are incorporated in and constitute a part of the specification, illustrate an embodiment of the invention, and, together with the description, serve to explain the principles of the invention, where.

DETAILED DESCRIPTION OF THE PREFERRED EMBODIMENTS

Figure 1:
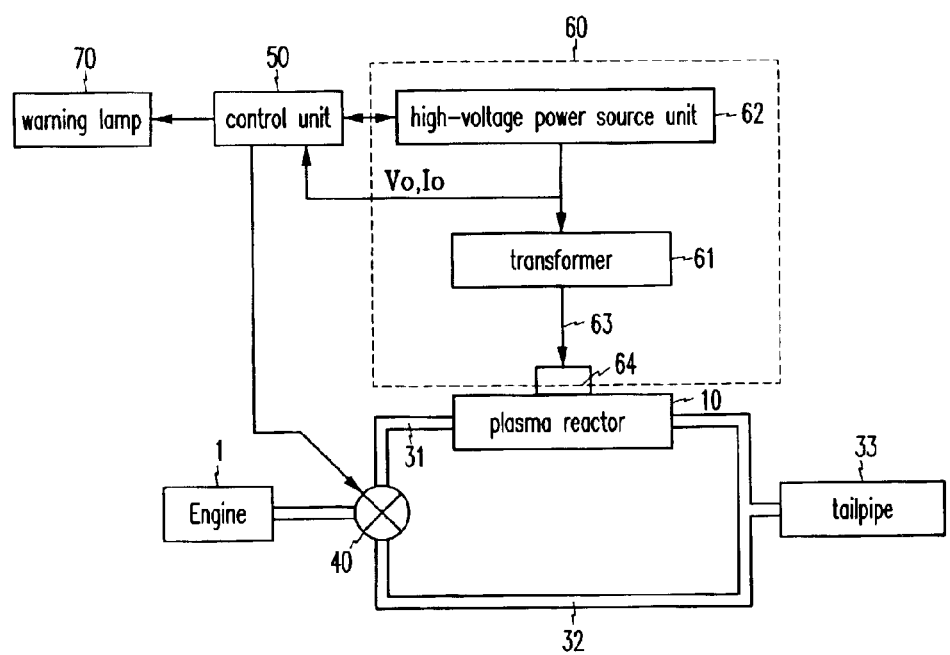
FIG. 1 is a block diagram of an emission treatment system using a plasma reactor for a vehicle according to an embodiment of the present invention.

As shown in FIG. 1, an emission treatment system according to a preferred embodiment of the present invention includes a plasma reactor 10 that is incorporated into an exhaust pipe from an engine 1 of a vehicle. A plasma range where corona discharge occurs is formed in the plasma reactor 10, and noxious material of exhaust gases is reduced while the exhaust gases pass through the plasma range.

A power supply unit 60 is configured to supply high-voltage electric power to the plasma reactor 10 and is electrically connected to the plasma reactor 10. The plasma reactor 10 is disposed in a direct-connecting pipe 31, which connects the plasma reactor 10 to the exhaust pipe of the engine 1 such that exhaust gases pass through the plasma reactor 10.

In an alternative embodiment and depending upon the particular application requirements, the direct-connecting pipe 31 can be a portion of the exhaust pipe that connects the engine 1 and a tailpipe 33. A bypass pipe 32 connects the direct-connecting pipe 31 both before and after the plasma reactor 10 such that the exhaust gases can flow from the engine 1 to a tailpipe 33 without passing through the plasma reactor 10, in response to a control valve 40 setting. The control valve 40 is disposed at a position where the direct-connecting pipe 31 and the bypass pipe 32 intersect. The control valve 40 is configured to selectively open and close the direct-connecting pipe 31 and the bypass pipe 32 so the flow path of the exhaust gases between the engine 1 and the tailpipe 33 can be regulated.

The emission treatment system further includes a control unit 50 configured to control the power supply unit 60 and the control valve 40. Therefore, the power supplied to the plasma reactor 10 and the flow of the exhaust gas can be regulated by the control unit 50. Preferably, the control unit 50 includes a processor, a memory, and other necessary hardware and software components as will be understood by persons skilled in the art, to permit the control unit 50 to execute the control functions as described herein.

The power supply unit 60 includes a high-voltage power source unit 62, a transformer 61 configured to boost the voltage of power supplied from the high-voltage power source unit 62, a high-voltage plug 64 for stably supplying the boosted power to the plasma reactor 10, and a high-tension cord 63 that connects the high-voltage power source unit 62 to the transformer 61 and to the high-voltage plug 64.

In a preferred embodiment the high-voltage power source unit 62 may be a battery (not shown). In alternative embodiments the high-voltage power source unit 62 may be a first alternator (not shown) of a vehicle or a second alternator (not shown) of the vehicle.

It is preferable that the emission treatment system of the present invention further includes a warning lamp 70 illuminated by a control signal from the control unit 50 in order to warn a driver of a malfunction of the plasma reactor 10. It is also preferable that illumination of the lamp 70 occurs when the plasma reactor malfunctions in an open circuit state. In alternative embodiments it is evident that the warning lamp 70 can be replaced by an alarm, a buzzer, or the like.

Finally, the exhaust emissions flow through the tailpipe 33 after passing through the direct-connecting pipe 31 and the plasma reactor 10, or after passing through the bypass pipe 32 if directed so by the control unit 50 and the control valve 40.

The operation of the emission treatment system according to an embodiment of the present invention is described below.

The control unit 50 controls voltage and current supplied to the transformer 61 from the high-voltage power source unit 62 based on a predetermined voltage/current map which accords to the driving conditions.

The transformer 61 boosts the voltage of the electric power supplied from the high-voltage power source unit 62, and then supplies the boosted power to the plasma reactor 10. Primary voltage (input voltage) $V_0$ of the transformer 61 and primary current (input current) $I_0$ of the transformer 61 are fed to the control unit 50. The control unit 50 determines whether the plasma reactor 10 is in an open circuit state or in a short circuit state based on the primary voltage $V_0$ and the primary current $I_0$ of the transformer 61. According to a result of this determination, the control unit 50 outputs a control signal to control the control valve 40 such that the main exhaust pipe 31 or the bypass pipe 32 is opened or closed. That is, if it is determined that the plasma reactor 10 is neither in the open circuit state nor in the short circuit state, the control unit 50 controls the control valve 40 to close the bypass pipe 32 such that exhaust emissions will pass through the plasma reactor 10. However, if it is determined that the plasma reactor 10 is in the open circuit state, the control unit 50 controls the warning lamp 70 to illuminate in order to warn a driver of a malfunction of the plasma reactor 10. Furthermore, upon determination that the plasma reactor 10 has short circuited, the control unit 50 signals the control valve 40 to close the direct-connecting pipe 31 and open the bypass pipe 32 such that exhaust emissions flow through the bypass pipe 32 to the tailpipe 33 without passing through the plasma reactor 10. Durability and stability of the plasma reactor 10 is increase and power consumption decreases by incorporation of the bypass pipe 32.

In an alternate embodiment, when a vehicle operates in operating modes other than an emission mode, it is preferable that the direct-connecting pipe 31 and the bypass pipe 32 are open at predetermined amounts. In this configuration the control valve 40 is open to a predetermined map angle.

Figure 2:
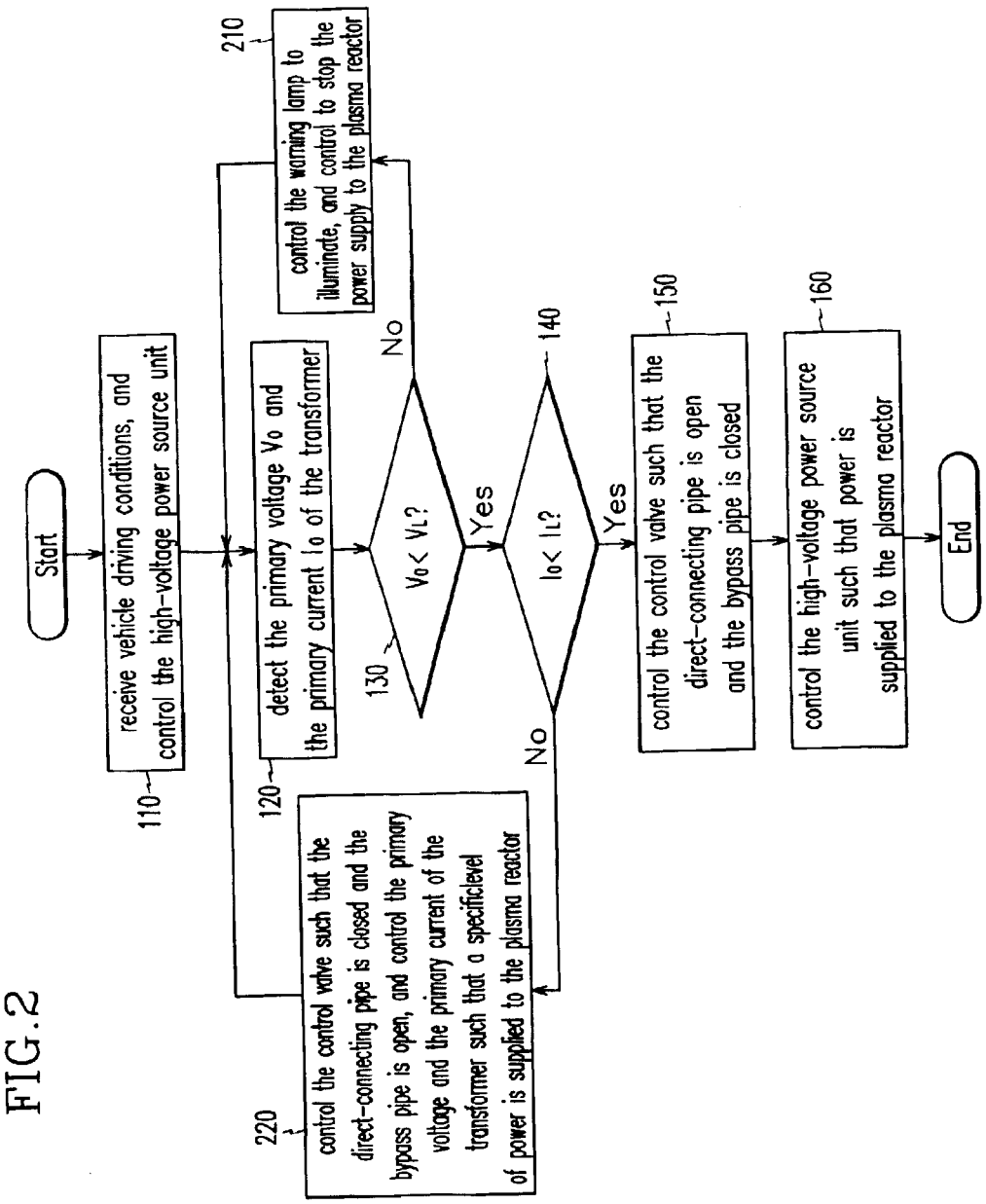
FIG. 2 is a flowchart of a control method for controlling the emission treatment system according to an embodiment of the present invention.

FIG. 2 shows a flowchart of the emission reduction control method using the emission reduction system according to an embodiment of the present invention.

First, the control unit 50 receives signals relating to vehicle driving conditions, calculates a target voltage output from the high-voltage power source unit 62, then signals the high-voltage power source unit 62 to generate the target voltage in step 110. A voltage of electric power output from the high-voltage power source unit 61 is boosted by the transformer 62, and is then supplied to the plasma reactor 10. The control unit 50 then detects the primary voltage $V_0$ and the primary current $I_0$ of the transformer 61 in step 120. Next, the control unit 50 determines whether the primary voltage $V_0$ of the transformer 61 is less than a predetermined voltage $V_L$ in step 130.

When the plasma reactor 10 operates normally, a voltage applied to the plasma reactor 10 generally decreases, so the primary voltage supplied by the transformer 61 decrease accordingly. However, if the primary voltage of the transformer 61 is not less than a predetermined voltage, the plasma reactor 10 is in the open circuit state. Thus, the control unit 50 illuminates the warning lamp 70 to warn a driver the plasma reactor 10 is in an open circuit condition. The control unit 50 also terminates the power supply to the plasma reactor 10 in step 210.

If the primary voltage $V_0$ of the transformer 61 is less than the predetermined voltage $V_L$, step 130, the control unit 50 determines whether the primary current $I_0$ of the transformer 61 is less than a predetermined current $I_L$, in step 140. When the plasma reactor 10 operates normally, a small current flows between two electrodes of the plasma reactor 10. However, if the plasma reactor 10 short circuits, a large current flows between the two electrodes of the plasma reactor 10. Therefore, when the primary current of the transformer is not less than the predetermined current, the plasma reactor 10 has short circuited. Thus, if it is determined that the primary current $I_O$ of the transformer 61 is not less than the predetermined current $I_L$ in step 140, the control unit 50 controls the control valve 40 such that the direct-connecting pipe 31 is closed and the bypass pipe 32 is open. Furthermore, the control unit 50 controls the primary voltage and the primary current of the transformer such that a specific level of power is supplied to the plasma reactor 10 in step 220. In use, upon determination that the plasma reactor 10 has short circuited, exhaust emissions are prevented from flowing through the plasma reactor 10 and a specific level of power is supplied to the plasma reactor 10 so that the plasma reactor 10 may perform a self-cleaning process.

If it is determined that the primary current $I_O$ of the transformer 61 is less than the predetermined current IL, in step 140, the control unit 50 controls the control valve 40 such that the direct-connecting pipe 31 is open and the bypass pipe 32 is closed, step 150. The control unit 50 then controls the high-voltage power source unit 62 such that power is supplied to the plasma reactor 10, step 160.

In use, it is possible to guarantee a stable operation of the plasma reactor and to reduce power consumption of the plasma reactor by allowing the plasma reactor to perform a self-cleaning process through control of the control valve. Therefore, the exhaust gases flow through the bypass pipe without passing through the plasma reactor if it is determined that the plasma reactor has short circuited.

Although alternate embodiments of the present invention have been described in detail it should be understood that many variations and modifications of the basic inventive concepts taught herein may appear to those skilled in the art. Furthermore, the above described embodiments are not intended to be an exhaustive list of the embodiments of the present invention as the present invention is intended to by defined by the sprit and scope of the appended claims.

What is claimed is:

1. An emission treatment system for a vehicle, comprising:
    a plasma reactor configured to reduce noxious emissions of an engine being disposed near one end of an exhaust pipe;
    a power supply unit for supplying power to said plasma reactor, wherein said power supply unit comprises:
        a power source unit for providing sower supplied to said plasma reactor; and
        a transformer configured to boost a voltage of power supplied from said power source unit and to supply said boosted power to said plasma reactor;
    a direct-connecting pipe configured to connect said plasma reactor to said exhaust pipe such that exhaust emissions can pass through said plasma reactor;
    a bypass pipe connected to said direct-connecting pipe both before and after said plasma reactor such that said exhaust emissions can bypass said plasma reactor;
    a control valve disposed at a position where said direct-connecting pipe and said bypass pipe intersect being configured to selectively open and close said direct-connecting pipe and said bypass pipe; and
    a control unit coupled to said power supply unit and said control valve, said control unit controlling a voltage of power supplied to said plasma reactor and an operation of said control valve, wherein said control unit is programmed to perform a control method comprising:
        detecting a primary voltage of said transformer;
        determining whether said detected primary voltage of said transformer is less than a predetermined voltage;
        stopping power supply to said plasma reactor if it is determined that said primary voltage is not less than said predetermined voltage;
        detecting a primary current from said transformer;
        determining whether said primary current of said transformer is less than a predetermined current; and
        controlling said control valve such that said exhaust pipe is closed and said bypass pipe is opened and controlling said power supply unit such that a predetermined level of power is supplied to said plasma reactor.

2. The emission treatment system of claim 1, wherein said power supply unit comprises: power source unit for providing power supplied to said plasma reactor;
    a transformer configured to boost a voltage of power supplied from said power source unit and supply said boosted power to said plasma reactor;
    a high-voltage plug disposed beside said plasma reactor and configured to stably supply the boosted power to said plasma reactor; and a high-tension cord for connecting said power source unit to said transformer and said transformer to said high-voltage plug.

3. The emission treatment system of claim 2, wherein said power source unit comprises a battery of the vehicle.

4. The emission treatment system of claim 2, wherein said power source unit comprises a first alternator of the vehicle.

5. The emission treatment system of claim 2, wherein said power source unit comprises a second alternator of the vehicle.

6. The emission treatment system of claim 1, further comprising a warning lamp configured to be illuminated by a control signal of said control unit to warn of a malfunction of said plasma reactor.

7. A method for controlling an emission treatment system including a plasma reactor, comprising:
    applying power to said plasma reactor configured to reduce noxious emissions of an engine;
    detecting a primary voltage and a primary current of a transformer configured to boost a voltage of power supplied to said plasma reactor;
    determining whether said primary voltage of said transformer is less than a predetermined voltage;
    determining whether said primary current of said transformer is less than a predetermined current if it is determined that said primary voltage is less than said predetermined voltage; and
    closing a bypass pipe such that exhaust emissions do not bypass said plasma reactor and opening a direct-connecting pipe configured such that exhaust emissions pass through said plasma reactor if it is determined that said primary current is less than said predetermined current.

8. The method of claim 7, further comprising stopping power supply to said plasma reactor if it is determined that said primary voltage of said transformer is not less than said predetermined voltage.

9. The method of claim 7, further comprising opening said bypass pipe and closing said direct-connecting pipe if it is determined that said primary current is not less than said predetermined current.

10. An emission treatment system, comprising:
    a plasma reactor disposed in a main exhaust pipe and configured to reduce noxious emissions of an engine;

a bypass pipe connected to said main exhaust pipe both before and after said plasma reactor such that exhaust emissions can bypass said plasma reactor;

a control valve disposed at a position where said main exhaust pipe and said bypass pipe intersect being configured to selectively open and close said main exhaust pipe and said bypass pipe;

a power supply unit for supplying power to said plasma reactor, wherein said power supply unit comprises:

a power source unit for providing power supplied to said plasma reactor; and a transformer configured to boost a voltage of power supplied from said power source unit and to supply said boosted power to said plasma reactor; and a control unit coupled to said power supply unit and said control valve wherein said control unit controls a voltage of power supplied to said plasma reactor and an operation of said control valve, wherein said control unit is programmed to perform a control method comprising:

detecting a primary voltage of said transformer;

determining whether said detected primary voltage of said transformer is less than a predetermined voltage;

stopping power supply to said plasma reactor if it is determined that said primary voltage is not less than said predetermined voltage;

detecting a primary current from said transformer;

determining whether said primary current of said transformer is less than a predetermined current; and controlling said control valve such that said exhaust pipe is closed and said bypass pipe is opened and controlling said power supply unit such that a predetermined level of power is supplied to said plasma reactor.

11. The emission treatment system of claim 10, wherein said power supply unit further comprises a high-voltage plug configured to stably supply the boosted power from said transformer to said plasma reactor.

12. The emission treatment system of claim 10, further comprising a warning lamp configured to be illuminated in response to a control signal from said control unit wherein said control method further comprises illuminating said warning lamp if it is determined that said primary voltage of said transformer is not less than said predetermined voltage.

* * * * *